United States Patent
Hu et al.

(10) Patent No.: US 9,160,586 B1
(45) Date of Patent: Oct. 13, 2015

(54) METHOD AND APPARATUS FOR ESTIMATING AND COMPENSATING FOR IN-PHASE AND QUADRATURE (IQ) MISMATCH IN A RECEIVER OF A WIRELESS COMMUNICATION DEVICE

(71) Applicant: Marvell International Ltd., Hamilton (BM)

(72) Inventors: Zixia Hu, Sunnyvale, CA (US); Songping Wu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/339,348

(22) Filed: Jul. 23, 2014

Related U.S. Application Data

(60) Provisional application No. 61/858,024, filed on Jul. 24, 2013.

(51) Int. Cl.
*H04L 27/00* (2006.01)
*H04L 1/00* (2006.01)
*H04L 27/38* (2006.01)

(52) U.S. Cl.
CPC .......... *H04L 27/0014* (2013.01); *H04L 1/0047* (2013.01); *H04L 27/3863* (2013.01); *H04L 2027/0026* (2013.01)

(58) Field of Classification Search
CPC ............ H04L 27/3863; H04L 27/3875; H04L 27/3809; H04L 27/22; H04B 14/006; H04B 17/21
USPC .................................................. 375/322, 324
See application file for complete search history.

(56) References Cited

U.S. PATENT DOCUMENTS 4,291,277 A   9/1981   Davis
4,967,164 A   10/1990  Sari
(Continued)

FOREIGN PATENT DOCUMENTS

EP   380167 B1   8/1994
EP   387948 B1   8/1994
(Continued)

OTHER PUBLICATIONS

Nam et al., "Blind Adaptive I/Q Imbalance Compensation Algorithms for Direct-Conversion Receivers", IEEE Signal Processing Letters, vol. 19, No. 8, Aug. 2012, pp. 475-478.
(Continued)

*Primary Examiner* — Betsy Deppe

(57) ABSTRACT

Systems and techniques relating to IQ mismatch estimation and compensation are described. A described technique includes obtaining samples of a received signal via circuitry having an IQ mismatch; determining an estimated gain imbalance parameter for the IQ mismatch based on an in-phase average value of in-phase training samples and a quadrature average value of quadrature training samples; determining an estimated phase imbalance parameter for the IQ mismatch based on a combined average value, the estimated gain imbalance parameter, and a squared average value, the combined average value being based on a pair-wise multiplication of the in-phase training samples and the quadrature training samples, the squared average value being based on squared versions of the in-phase training samples; updating the in-phase data samples based on the estimated gain imbalance parameter to produce updated in-phase data samples; and updating the quadrature data samples by respectively adding quadrature update values thereto.

22 Claims, 10 Drawing Sheets

(56) References Cited

U.S. PATENT DOCUMENTS

| | | | |
|---|---|---|---|
| 5,049,832 A | 9/1991 | Cavers | |
| 5,107,520 A | 4/1992 | Karam | |
| 5,148,448 A | 9/1992 | Karam | |
| 5,253,272 A | 10/1993 | Jaeger | |
| 5,369,411 A * | 11/1994 | Lisle, Jr. | 342/194 |
| 5,486,789 A | 1/1996 | Palandech | |
| 5,760,646 A | 6/1998 | Belcher | |
| 5,892,397 A | 4/1999 | Belcher | |
| 5,905,760 A | 5/1999 | Schnabl | |
| 5,910,965 A | 6/1999 | Ierfino | |
| 5,929,703 A | 7/1999 | Sehier | |
| 5,949,283 A | 9/1999 | Proctor | |
| 5,959,499 A | 9/1999 | Khan | |
| 6,072,364 A | 6/2000 | Jeckeln | |
| 6,075,411 A | 6/2000 | Briffa | |
| 6,078,216 A | 6/2000 | Proctor | |
| 6,108,385 A | 8/2000 | Worley | |
| 6,118,335 A | 9/2000 | Nielsen | |
| 6,194,964 B1 | 2/2001 | Jun | |
| 6,236,837 B1 | 5/2001 | Midya | |
| 6,240,144 B1 | 5/2001 | Ha | |
| 6,240,278 B1 | 5/2001 | Midya | |
| 6,252,912 B1 | 6/2001 | Salinger | |
| 6,275,685 B1 | 8/2001 | Wessel | |
| 6,288,610 B1 | 9/2001 | Miyashita | |
| RE37,407 E | 10/2001 | Eisenberg | |
| 6,298,096 B1 | 10/2001 | Burgin | |
| 6,298,097 B1 | 10/2001 | Shalom | |
| 6,320,463 B1 | 11/2001 | Leva | |
| 6,587,514 B1 | 7/2003 | Wright et al. | |
| 6,836,517 B2 | 12/2004 | Nagatani | |
| 6,928,122 B2 | 8/2005 | Opas | |
| 6,963,242 B2 | 11/2005 | White | |
| 6,985,704 B2 | 1/2006 | Yang | |
| 7,058,369 B1 | 6/2006 | Wright | |
| 7,071,777 B2 | 7/2006 | McBeath | |
| 7,085,330 B1 | 8/2006 | Shirali | |
| 7,102,430 B2 | 9/2006 | Johnson | |
| 7,184,490 B1 | 2/2007 | Rybicki | |
| 7,203,247 B2 | 4/2007 | Bauder | |
| 7,289,575 B1 | 10/2007 | Kenington | |
| 7,313,199 B2 | 12/2007 | Gupta | |
| 7,362,821 B1 | 4/2008 | Shirali | |
| 7,535,974 B1 | 5/2009 | Shirali | |
| 8,326,239 B1 | 12/2012 | Peiris | |
| 8,340,602 B1 | 12/2012 | Peiris | |
| 8,498,591 B1 | 7/2013 | Qian | |
| 8,699,620 B1 | 4/2014 | Wu | |
| 2001/0004223 A1 | 6/2001 | Kim | |
| 2002/0065048 A1 | 5/2002 | Nagatani | |
| 2006/0198475 A1 * | 9/2006 | Wu et al. | 375/346 |
| 2008/0025381 A1 * | 1/2008 | Lee et al. | 375/219 |
| 2008/0139141 A1 | 6/2008 | Varghese | |
| 2011/0216858 A1 * | 9/2011 | Zeng | 375/346 |

FOREIGN PATENT DOCUMENTS

| | | |
|---|---|---|
| WO | WO9804034 A1 | 1/1998 |
| WO | WO9828888 A1 | 7/1998 |
| WO | WO0001065 A1 | 1/2000 |
| WO | WO0215389 A1 | 2/2002 |

OTHER PUBLICATIONS

Valkama et al., "Advanced Methods for I/Q Imbalance Compensation in Communication Receivers", IEEE Transactions on Signal Processing, vol. 49, No. 10 Oct. 2011, pp. 2335-2344.

Deng et al., "Low Complexity I/Q Imbalance and Channel Estimation Techniques for MIMO OFDM Systems", ICACT2013, ISBN 978-89-968650-1-8, Jan. 2013, pp. 238-243.

Pun et al., "Correction of frequency-dependent I/Q mismatches in quadrature receivers", Electronics Letters, vol. 37, No. 23, Nov. 8, 2001, pp. 1415-1417.

Schuchert et al., "A Novel IQ imalance compensation scheme for the reception of OFDM signals", IEEE, Jun. 25, 2001, pp. 313-318.

Yu, et al., "A Novel Adaptive mismatch Cancellation System for Quadrature IF Radio Receivers", IEEE Transactions on Circuits and Systems-II: Analog and Digital Signal Processing, vol. 46, No. 6, Jun. 1999, pp. 789-801.

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g, 2003, 69 pages.

Andreani, P., et al., "Chip for Wideband Digital Predistortion RF Power Amplifier Linearization", Electronics Letters, May 22, 1997, pp. 925-926, vol. 33, No. 11, IEEE, 2 pages.

Ansi/IEEE, Std. 802.11, 1999 Edition, Part 11: Wireless LAN Medium Access Control (MAC) and Physical Layer (PHY) Specifications, Aug. 20, 1999, IEEE, 531 pages.

Cavers, James K., "The Effect of Quadrature Modulator and Demodulator Errors on Adaptive Digital Predistorters for Amplifier Linearization", IEEE Transactions on Vehicular Technology, May 1997, pp. 456-466, vol. 46, No. 2, IEEE, 11 pages.

D'Andrea, Aldo N., et al. "A Digital Approach to Efficient RF Power Amplifier Linearization", Proc. of IEEE Globe COMM '97, 1997, pp. 77-81, IEEE, 3 pages.

Faulkner, Michael, et al., "Adaptive Linearization Using Predistortion—Experimental Results, IEEE Transactions on Vehicular Technology", May 1994, pp. 323-332, vol. 43, No. 2, IEEE, 10 pages.

IEEE Std 802.11 b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11a-1999 (Supplement to IEEE Std 802.11-1999) [Adopted by ISOIIEC and redesignated as ISOIIEC 8802-11: 1999/ Amd 1 :2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

"Information technology—Telecommunications and information exchange between systems—Local and metropolitan networks—specific requirements. Part 11: Wireless LAN Medium Access Control (MAC) and Physical Layer (PHY) Specifications", IEEE Std. 802.11n, Oct. 29, 2009, 535 pages.

Johnson, Daniel Eric, "Adaptive Digital Predistortion with Applications for LMDS Systems", Aug. 25, 2000, Virginia Polytechnic Institute and State University, US, 98 pages.

Sundstrom, Lars, et al., "Effects of Reconstruction Filters in Digital Predistortion Linearizers for RF Power Amplifiers", IEEE Transactions on Vehicular Technology, Feb. 1995, pp. 131 139, vol. 44, No. 1, IEEE US, 9 pages.

Sundstrom, Lars, et al., "Quantization Analysis and Design of a Digital Predistortion Linearizer for RF Power Amplifiers", IEEE Transactions on Vehicular Technology, Nov. 1996, pp. 707-719, vol. 45, No. 4, IEEE, 13 pages.

Zavosh, Frank, et al., "Digital Predistortion Techniques for RF Power Amplifiers with CDMA Applications", Microwave Journal, Oct. 1999, Horizon House Publications, 9 pages.

* cited by examiner

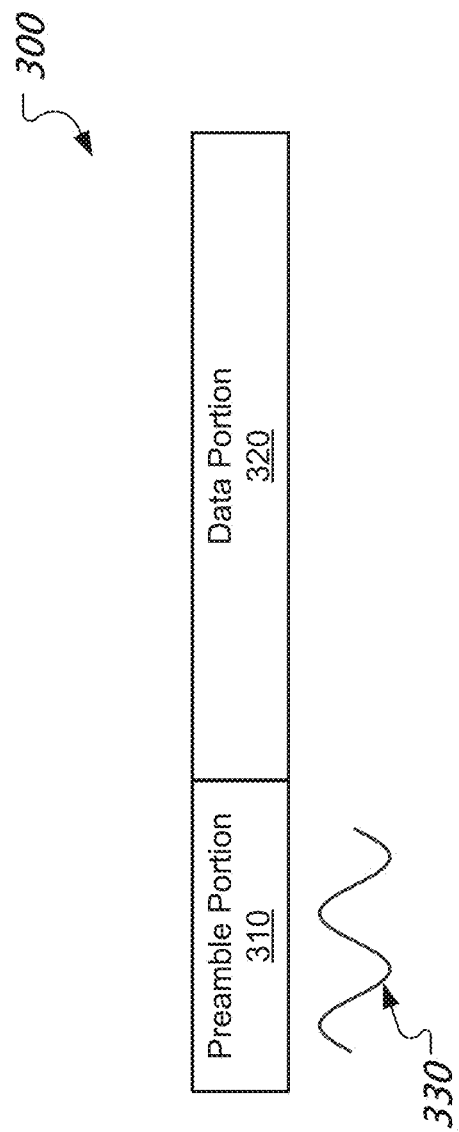

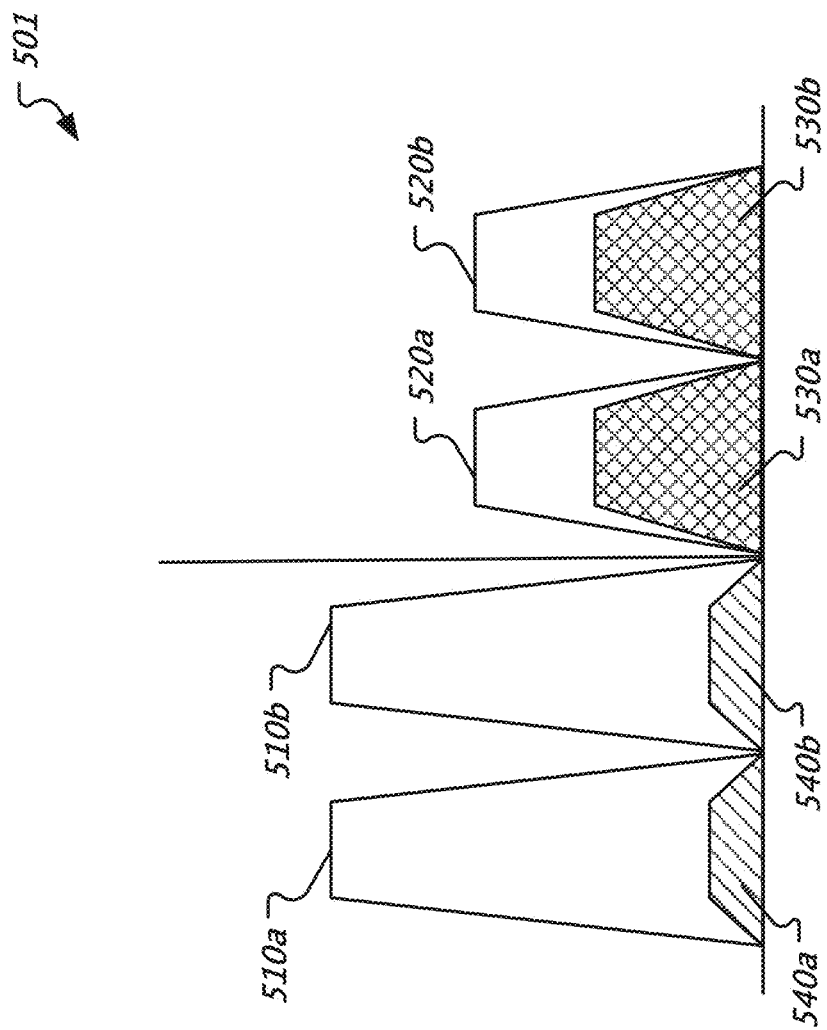

METHOD AND APPARATUS FOR ESTIMATING AND COMPENSATING FOR IN-PHASE AND QUADRATURE (IQ) MISMATCH IN A RECEIVER OF A WIRELESS COMMUNICATION DEVICE

CROSS REFERENCE TO RELATED APPLICATION

This disclosure claims the benefit of the priority of U.S. Provisional Application Ser. No. 61/858,024, filed Jul. 24, 2013 and entitled "Receiver IQ Mismatch Estimation and Calibration." The above-identified application is incorporated herein by reference in its entirety.

BACKGROUND

Communication devices can use analog quadrature downmixing on a received signal to produce signals on an in-phase (I) branch and a quadrature (Q) branch. Due to hardware imperfections or differences between the I and Q branches, there may exist an in-phase/quadrature (IQ) mismatch between the I and Q branches. Devices can use one or more techniques to estimate and compensate for the IQ mismatch. Such techniques can include blind estimation, non-blind estimation, adaptive estimation, or non-adaptive estimation.

Devices such as wireless communication devices can use one or more wireless communication technologies such as orthogonal frequency division multiplexing (OFDM), code division multiple access (CDMA), or direct-sequence spread spectrum (DSSS). Wireless communication devices can communicate based on one or more wireless standards such as Bluetooth, wireless local area network (WLAN) standards such as IEEE 802.11 standards, or a ZigBee standard. Various examples of wireless communication devices include mobile phones, smart phones, wireless routers, wireless hubs, base stations, and access points. In some cases, wireless communication electronics are integrated with data processing equipment such as laptops, personal digital assistants, and computers.

SUMMARY

The present disclosure includes systems and techniques related to IQ mismatch estimation and compensation.

According to an aspect of the described systems and techniques, a method for IQ mismatch estimation and compensation includes obtaining samples of a received signal via circuitry having an IQ mismatch, the samples including (i) first samples, including in-phase first samples and quadrature first samples, of a training signal of the received signal and (ii) second samples, including in-phase second samples and quadrature second samples, of a data signal of the received signal; determining an estimated gain imbalance parameter for the IQ mismatch based on an in-phase average value and a quadrature average value, the in-phase average value being based on the in-phase first samples, and the quadrature average value being based on the quadrature first samples; determining an estimated phase imbalance parameter for the IQ mismatch based on a combined average value, the estimated gain imbalance parameter, and a squared average value, the combined average value being based on a pair-wise multiplication of the in-phase first samples and the quadrature first samples, the squared average value being based on squared versions of the in-phase first samples; updating the in-phase second samples based on the estimated gain imbalance parameter to produce updated in-phase second samples; and updating the quadrature second samples by respectively adding thereto quadrature update values to produce updated quadrature second samples, the quadrature update values being respectively based on the estimated phase imbalance parameter and the updated in-phase second samples. Other implementations are directed to systems, devices and computer-readable, storage mediums.

These and other implementations can include one or more of the following features. Determining the estimated gain imbalance parameter can include calculating in accordance with $$\varepsilon_{est} = \frac{E[Q']}{E[I']} - 1,$$

where $\varepsilon_{est}$ represents the estimated gain imbalance parameter, $E[Q']$ represents the quadrature average value, and $E[I']$ represents the in-phase average value. Determining the estimated phase imbalance parameter can include calculating in accordance with $$\phi_{est} = \frac{E[I' \cdot Q']}{-E[I'^2] \cdot (1 + \varepsilon_{est})/4},$$

where $\phi_{est}$ represents the estimated phase imbalance parameter, $E[I' \cdot Q']$ represents the combined average value, and $E[I'^2]$ represents the squared average value. Updating the in-phase second samples can include multiplicatively applying a factor based on $\varepsilon_{est}$ to each of the in-phase second samples. Updating the quadrature second samples can include multiplicatively applying a factor based on $\phi_{est}$ to each of the updated in-phase second samples to respectively produce the quadrature update values. Determining the estimated phase imbalance parameter can include calculating in accordance with $$\phi_{est} = \arcsin\left(\frac{E[I' \cdot Q']}{-E[I'^2] \cdot (1 + \varepsilon_{est})/4}\right),$$

where $\phi_{est}$ represents the estimated phase imbalance parameter, $E[I' \cdot Q']$ represents the combined average value, and $E[I'^2]$ represents the squared average value. In some implementations, the training signal can include a single tone signal. In some implementations, the training signal corresponds to a preamble portion of a packet, and the data signal corresponds to a data portion of the packet.

In another aspect, a method for IQ mismatch estimation and compensation includes obtaining I samples and Q of a training signal received via circuitry having an IQ mismatch; estimating an IQ gain imbalance for the circuitry using an approximation formed from a summation of Q samples in relation to a summation of I samples; estimating an IQ phase imbalance for the circuitry using an approximation formed from a summation of a combination of the Q samples and the I samples; using the estimated IQ gain imbalance to update a gain compensation on an I branch of the circuitry; and using the estimated IQ phase imbalance and the updated gain compensation on the I branch to update a phase compensation on a Q branch of the circuitry.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

In another aspect, an apparatus for IQ mismatch estimation and compensation can include first circuitry and second circuitry coupled with the first circuitry. The first circuitry can be configured to determine an in-phase average value based on (i) in-phase first samples of a training signal received via circuitry having an IQ mismatch, (ii) a quadrature average value based on quadrature first samples of the training signal, (iii) a squared average value based on squared versions of the in-phase first samples, and (iv) a combined average value based on a pair-wise multiplication of the in-phase first samples and the quadrature first samples; determine an estimated gain imbalance parameter for the IQ mismatch based on the in-phase average value and the quadrature average value; and determine an estimated phase imbalance parameter for the IQ mismatch based on (i) the combined average value, (ii) the estimated gain imbalance parameter, and (iii) the squared average value. The second circuitry can be configured to update in-phase second samples of a data signal received via the circuitry having the IQ mismatch based on the estimated gain imbalance parameter to produce updated in-phase second samples, and update quadrature second samples of the data signal by respectively adding quadrature update values to the quadrature second samples to produce updated quadrature second samples, the quadrature update values being respectively based on (i) the estimated phase imbalance parameter and (ii) the updated in-phase second samples.

In another aspect, a system for IQ mismatch estimation and compensation can include a downconverter configured to receive signals including a training signal and a data signal; an analog-to-digital convertor coupled with the downconverter, and configured to produce samples based on the receive signals, the samples including (i) first samples of the training signal and (ii) second samples of the data signal, the first samples including (i) in-phase first samples and (ii) quadrature first samples, the second samples including (i) in-phase second samples and (ii) quadrature second samples; and a processor coupled with the convertor. The processor can be configured to perform operations including: determining an in-phase expected value based on (i) the in-phase first samples, (ii) a quadrature expected value based on the quadrature first samples, (iii) a squared expected value based on squared versions of the in-phase first samples, and (iv) a combined expected value based on a pair-wise multiplication of the in-phase first samples and the quadrature first samples; determining an estimated gain imbalance parameter for an IQ mismatch associated with at least the downconverter based on (i) the in-phase expected value and (ii) the quadrature expected value; determining an estimated phase imbalance parameter for the IQ mismatch based on (i) the combined expected value, (ii) the estimated gain imbalance parameter, and (iii) the squared expected value; updating the in-phase second samples based on the estimated gain imbalance parameter to produce updated in-phase second samples; and updating the quadrature second samples by respectively adding thereto quadrature update values to produce updated quadrature second samples, the quadrature update values being respectively based on the estimated phase imbalance parameter and the updated in-phase second samples.

Particular configurations of the technology described in this disclosure can be implemented so as to realize one or more of the following potential advantages. A described IQ mismatch estimation and compensation technique can achieve a high image rejection ratio such as better than −60 dBc (decibels relative to carrier). A described IQ mismatch estimation and compensation technique can be implemented using low-complexity circuitry, algorithms, or both, which correspond to efficient approximations of IQ mismatch estimation and calibration that can enable lower-cost devices to be manufactured. Practical analog front-end impairments can be considered in the design, and competitive performance can be achieved in the practical scenarios for device deployment.

Details of one or more implementations are set forth in the accompanying drawings and the description below. Other features and advantages may be apparent from the description and drawings, and from the claims.

DRAWING DESCRIPTIONS

FIG. 3 shows a layout for an example of a packet transmitted by a device.

FIG. 5 shows a graph for an example of mirror frequency interference caused by an IQ mismatch.

Like reference symbols in the various drawings indicate like elements.

DETAILED DESCRIPTION

Figure 1:
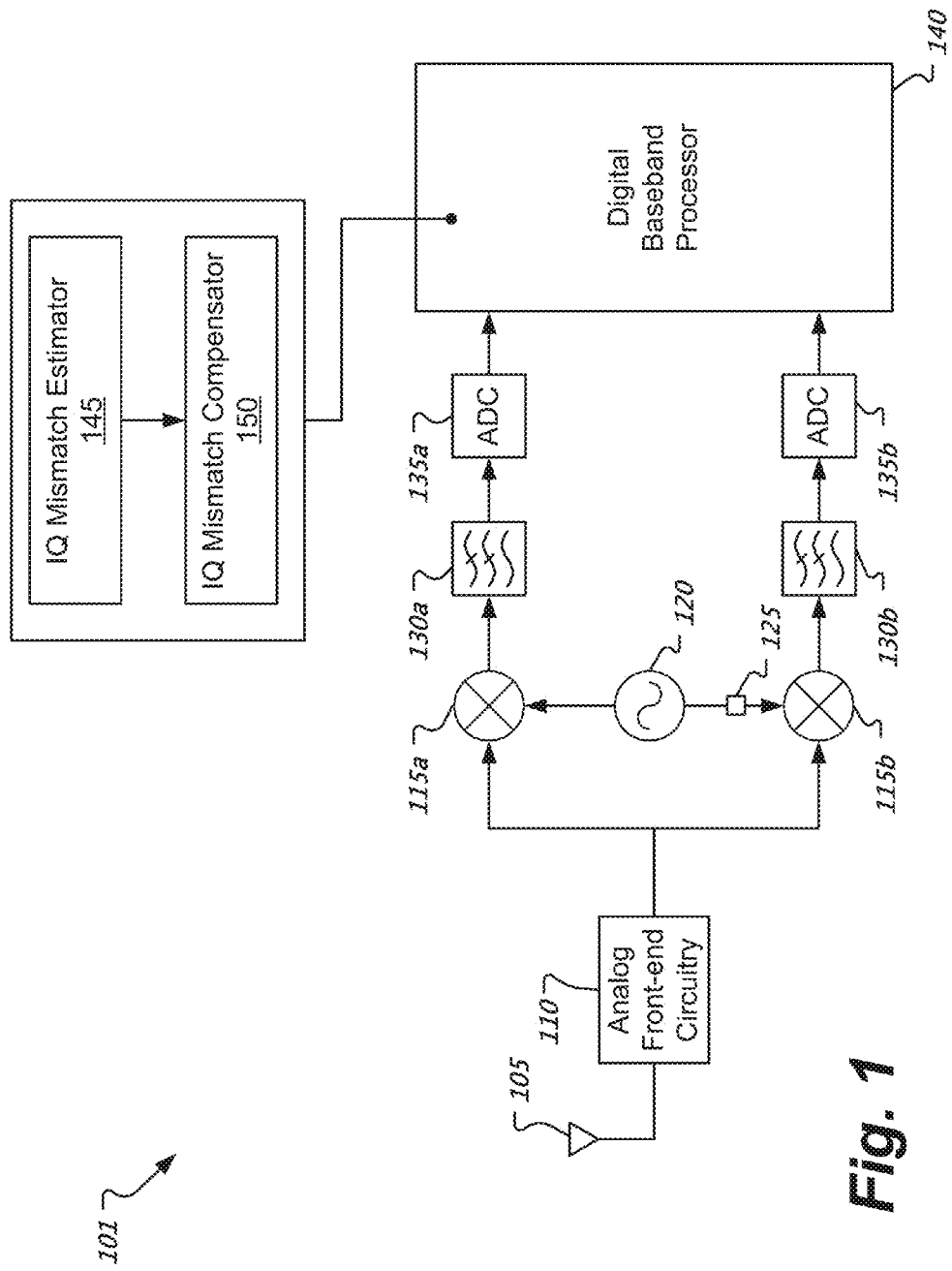
FIG. 1 shows an architecture for an example of a wireless communication device, which includes an IQ mismatch estimator and an IQ mismatch compensator.

FIG. 1 shows an architecture for an example of a wireless communication device 101, which includes an IQ mismatch estimator 145 and IQ mismatch compensator 150. The device further includes an antenna 105, analog front-end circuitry 110, mixers 115a-b, local oscillator 120, phase shifter 125, filters 130a-b, analog-to-digital converters (ADCs) 135a-b, and a digital baseband processor 140. The analog front-end circuitry 110 can include a downconverter to convert a carrier band signal into a baseband signal. The mixers 115a-b can further downconvert the baseband signal into an I signal and a Q signal respectively. The processor 140 can be configured to perform IQ mismatch estimation and compensation via estimator 145 and compensator 150 respectively. The estimator 145 can estimate parameters for an IQ mismatch associated with circuitry such IQ circuitry of the device 101 which can include mixers 115a-b, local oscillator 120, phase shifter 125, filters 130a-b, ADCs 135a-b, or a combination thereof.

An IQ mismatch or imbalance can exist between the mixers 115a-b due to factors such as manufacturing imperfections or variations in a device's physical characteristics. The input to the I mixer 115a can be modeled as $\cos(2\pi f_{LO} t)$, where $f_{LO}$ represents a frequency of the local oscillator 120. The input to the Q mixer 115b can be modeled as $-\alpha \cdot \sin(2\pi f_{LO} t + \phi)$. The IQ imbalance includes a gain imbalance $\epsilon = \alpha - 1$, and a phase imbalance $\phi$. An image rejection ratio (IRR) can be defined as follows:

$$IRR = \frac{1 + (1+\epsilon)^2 - 2(1+\epsilon)\cos\phi}{1 + (1+\epsilon)^2 + 2(1+\epsilon)\cos\phi}$$

$$\approx \frac{\epsilon^2 + \phi^2}{4}.$$

In some implementations, a −60 dBc IRR can be targeted such that after an IQ mismatch calibration, a residual gain imbalance and a residual phase imbalance should satisfy the following respectively: $\epsilon_r < 10^{-3}$ and $\phi_r < 0.05$. Other tolerances for residual imbalances are possible and can be based on one or more design goals of a device.

In some implementations, the digital baseband processor 140 includes two or more processor cores. In some implementations, the device 101 includes a system-on-a-chip (SoC). For example, the SoC can include a host processor and a digital signal processor configured as the digital baseband processor 140. In some implementations, the antenna 105 is one of many antennas, which can be configured for multiple-in-multiple-out (MIMO) wireless communications.

Figure 2:
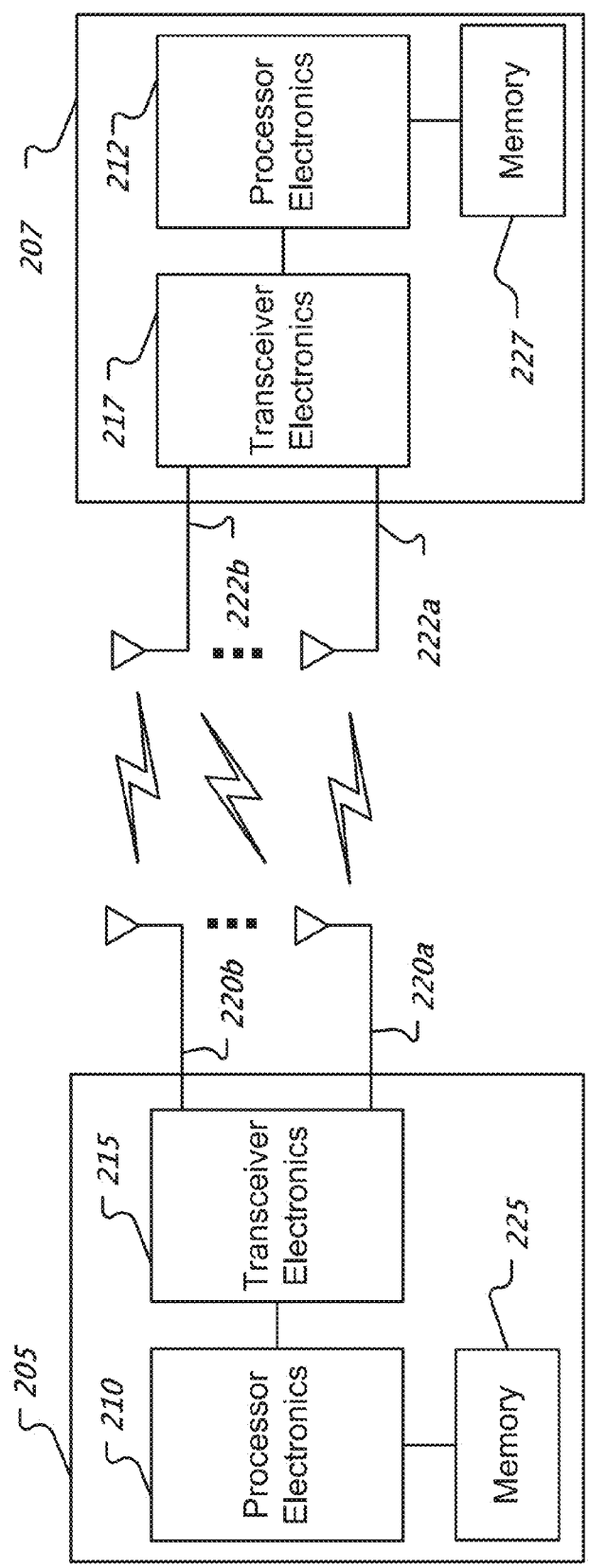
FIG. 2 shows an example of a wireless network with two wireless communication devices.

FIG. 2 shows an example of a wireless network with two wireless communication devices. Wireless communication devices 205, 207 such as an access point (AP), base station (BS), wireless headset, access terminal (AT), client station, or mobile station (MS) can include circuitry such as processor electronics 210, 212. Circuitry such as processor electronics 210, 212 can include one or more processors that implement one or more techniques presented in this disclosure. Wireless communication devices 205, 207 include circuitry such as transceiver electronics 215, 217 to send and receive wireless signals over one or more antennas 220a-b, 222a-b. In some implementations, transceiver electronics 215, 217 include integrated transmitting and receiving circuitry. Wireless communication devices 205, 207 include one or more memories 225, 227 configured to store information such as data, instructions, or both. In some implementations, wireless communication devices 205, 207 include dedicated circuitry for transmitting and dedicated circuitry for receiving. The transceiver electronics 215, 217 can include circuitry having an IQ mismatch. Further, the memories 225, 227 can store an IQ estimation and compensation technique as described herein to handle the IQ mismatch.

FIG. 3 shows a layout for an example of a packet 300 transmitted by a device. The packet 300 includes a preamble portion 310 and a data portion 320. The preamble portion 310 includes a baseband waveform 330 having a single tone signal that represents one or more training symbols. The data portion 320 includes one or more data symbols. In some implementations, the baseband waveform 330 is based on $s(t) = \exp(j \cdot 2\pi f_{sig} t)$, where $f_{sig}$ is a frequency component of the baseband waveform 330. Hence, the baseband waveform 330 has an I branch component of $I = \cos(2\pi f_{sig} t)$ and a Q branch component of $Q = \sin(2\pi f_{sig} t)$. Baseband signals representing the packet 300 can be up-converted to a carrier band for transmission.

Figure 4A:
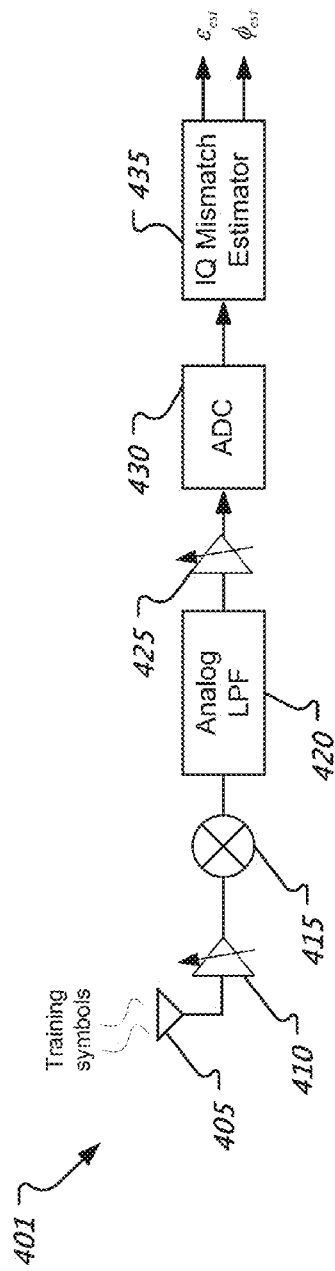
FIGS. 4A and 4B show a simplified diagram for an example of a device configured to perform IQ estimation and compensation on a received version of the packet of FIG. 3.
Figure 4B:
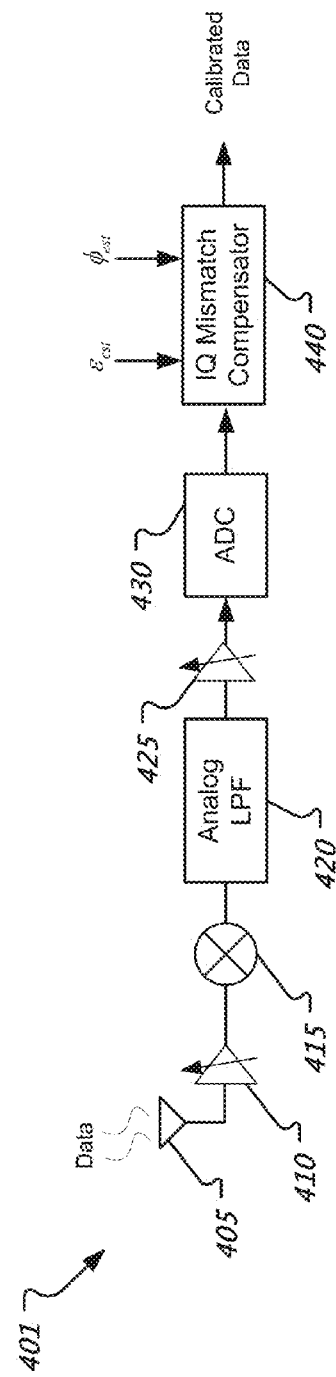

FIGS. 4A and 4B show a simplified diagram for an example of a device 401 configured to perform IQ estimation and compensation on a received version of the packet of FIG. 3. FIG. 4A shows a diagram of a portion of the device 401 that includes an IQ mismatch estimator 435. The device 401 includes an antenna 405, low-noise amplifier (LNA) 410, mixer 415, analog low pass filter (LPF) 420, baseband (BB) circuitry 425, ADC 430, and IQ mismatch estimator 435. The mixer 415 can perform a downconversion from a carrier band signal into a baseband signal. In some implementations, the ADC 430 is operated at 12 Mhz, other frequencies are possible. In some implementations, the circuitry 425 includes the ADC 430. The circuitry 425 can include an I branch and a Q branch that respectively include an I mixer and a Q mixer that are configured to downconvert an output of the LPF 420 into I and Q signals respectively. In some implementations, the ADC 430 includes a first ADC for converting the I branch signals and a second ADC for converting the Q branch signals.

During an estimation mode, the device 401 uses the IQ mismatch estimator 435 to produce estimated parameters for an IQ mismatch associated with at least circuitry 425. After IQ downconversion, an IQ mismatch is introduced which can be modeled as $$I' = \frac{1}{2} I$$

and $$Q' = -\frac{1+\epsilon}{2}\sin\phi \cdot I + \frac{1+\epsilon}{2}\cos\phi \cdot Q,$$

where I' and Q' respectively represent the IQ mismatch versions of I and Q. The gain imbalance can be estimated as follows. Note that $$\begin{cases} E[I'^2] = \frac{1}{4} E[I^2] \\ E[Q'^2] = \frac{(1+\epsilon)^2}{4} E[Q^2] + \sin 2\phi E[I \cdot Q] = \frac{(1+\epsilon)^2}{4} E[I^2] \end{cases}$$

where $E[\cdot]$ represents an expected value function. This pair of expected value equations can be substituted with:

$$\begin{cases} E[I'] = \frac{1}{2} E[I] \end{cases}$$

$$E[Q'] = \frac{(1+\varepsilon)}{2} E[I]$$

and the estimated gain imbalance can be computed as follows:

$$\varepsilon_{est} = \frac{E[Q']}{E[I']} - 1.$$

In some implementations, an expected value of the I samples is based on an average of the I samples, and an expected value of the Q samples is based on an average of the Q samples. In some implementations, the estimated gain imbalance is calculated based on a sum of Q samples and a sum of I samples. The phase imbalance can be estimated as follows. Note that $$E[I' \cdot Q'] = -\frac{(1+\varepsilon_{est})}{4} \sin\phi \cdot E[I^2]$$

and the estimated phase imbalance can be computed as follows:

$$\phi_{est} = \arcsin\left(\frac{E[I' \cdot Q']}{-E[I'^2] \cdot (1+\varepsilon_{est})/4}\right).$$

For small θ, arcsin(θ) can be approximated by using θ itself. As a result, $$\phi_{est} \approx \frac{E[I' \cdot Q']}{-E[I'^2] \cdot (1+\varepsilon_{est})/4}$$

The IQ mismatch estimator 435 can provide parameters including $\varepsilon_{est}$ and $\phi_{est}$ to an IQ mismatch compensator.

FIG. 4B shows a diagram of a portion of the device 401 that includes an IQ mismatch compensator 440. During a compensation mode, the device 401 uses an IQ mismatch compensator 440 to update samples received from the ADC 430 based on the estimated parameters determined by the IQ mismatch estimator 435. In some implementations, IQ mismatch estimator 435 retrieves parameters including $\varepsilon_{est}$ and $\phi_{est}$ from the IQ mismatch estimator 435 via a memory (not shown). The IQ mismatch compensator 440 can perform gain compensation on the I branch based on $$I_{update} = \frac{(1+\varepsilon_{est}) I'}{2}.$$

For phase compensation on the Q branch, note that $$Q' = -\frac{1+\varepsilon}{2} \sin\phi \cdot I + \frac{1+\varepsilon}{2} \cos\phi \cdot Q;$$

also note that $$Q_{update} = \frac{(1+\varepsilon_{est}) Q}{2}$$

should hold. As a result, the IQ mismatch compensator 440 can perform phase compensation on the Q branch based on $$Q_{update} = \frac{Q' + \frac{1+\varepsilon_{est}}{2} \sin\phi_{est} \cdot I'}{\cos\phi_{est}}.$$

Using an approximation, the IQ mismatch compensator 440 can perform phase compensation on the Q branch based on $Q_{update} \approx Q' + \phi_{est} \cdot I_{update}$.

FIG. 5 shows a graph 501 for an example of mirror frequency interference caused by an IQ mismatch. An IQ mismatch is commonly seen in a RF front-end that uses analog quadrature down-mixing. It results in mirror frequency interference. As shown in a frequency domain, strong subband signals 510*a-b* can generate severe interference to weaker subband signals 520*a-b* in mirror positions. In this example, the mirror frequency interferences corresponding to the strong subband signals 510*a-b* are shown by interference signals 530*a-b*. The mirror frequency interferences corresponding to the weaker subband signals 520*a-b* are shown by interference signals 540*a-b*. Since the strong subband signals 510*a-b* produce strong interference signals 530*a-b* that overlap with the weaker subband signals 520*a-b*, a high detection error rate can occur for the weaker subband signals 520*a-b*. In some implementations, the strong subband signals 510*a-b* can correspond to WLAN signals, and the weaker subband signals 520*a-b* can correspond to Zigbee signals.

Figure 6:
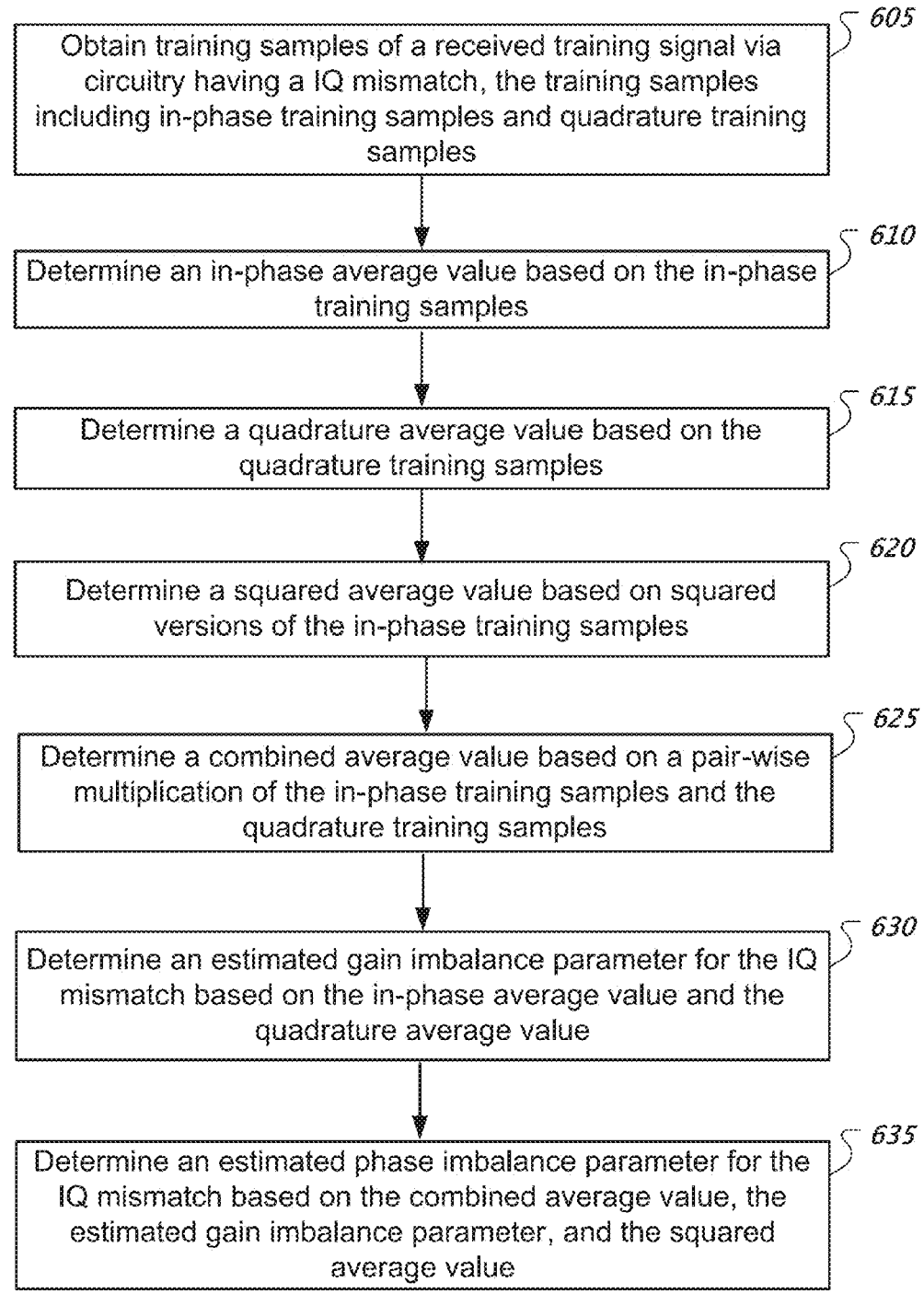
FIG. 6 shows a flowchart for an example of an IQ mismatch estimation process.

FIG. 6 shows a flowchart for an example of an IQ mismatch estimation process. At 605, the process obtains samples of a received training signal (referred to herein as "training samples") via circuitry having an IQ mismatch. The training samples can include in-phase training samples and quadrature training samples. Obtaining training samples can include retrieving in-phase samples from an ADC associated with an in-phase branch and retrieving quadrature samples from an ADC associated with a quadrature branch. In some implementations, in-phase training samples and quadrature training samples are placed in two respective arrays in a memory. In some implementations, a training signal is a single tone signal; the tone signal can be predetermined and known to both sides. In some implementations, a training signal is located within a preamble portion of a packet.

At 610, the process determines an in-phase average value based on the in-phase training samples. Determining the in-phase average value can include averaging N in-phase samples, where N is greater than one. At 615, the process determines a quadrature average value based on the quadrature training samples. Determining the quadrature average value can include averaging N quadrature samples. At 620, the process determines a squared average value based on squared versions of the in-phase training samples. Determining the squared average value can include squaring N in-phase samples, and averaging over the resulting values.

At 625, the process determines a combined average value based on a pair-wise multiplication of the in-phase training samples and the quadrature training samples. The pair-wise multiplication can include computing $c_i = a_i \cdot b_i$, $i=1, 2, \ldots, N$ where $a_i$ represents an in-phase training sample and $b_i$ represents a quadrature training sample. Determining the combined average value can include computing $$\hat{c} = \frac{1}{N}\sum_{1}^{N} c_i.$$

At 630, the process determines an estimated gain imbalance parameter for the IQ mismatch based on the in-phase average value and the quadrature average value. Determining the estimated gain imbalance parameter can include calculating $$\varepsilon_{est} = \frac{E[Q']}{E[I']} - 1,$$

where E[Q'] represents the quadrature average value, and E[I'] represents the in-phase average value.

At 635, the process determines an estimated phase imbalance parameter for the IQ mismatch based on the combined average value, the estimated gain imbalance parameter, and the squared average value. Determining the estimated phase imbalance parameter can include calculating:

$$\phi_{est} = \arcsin\left(\frac{E[I' \cdot Q']}{-E[I'^2] \cdot (1 + \varepsilon_{est})/4}\right),$$

where $E[I' \cdot Q']$ represents the combined average value, and $E[I'^2]$ represents the squared average value. In some implementations, determining the estimated phase imbalance parameter can include calculating:

$$\phi_{est} = \frac{E[I' \cdot Q']}{-E[I'^2] \cdot (1 + \varepsilon_{est})/4}.$$

Figure 7:
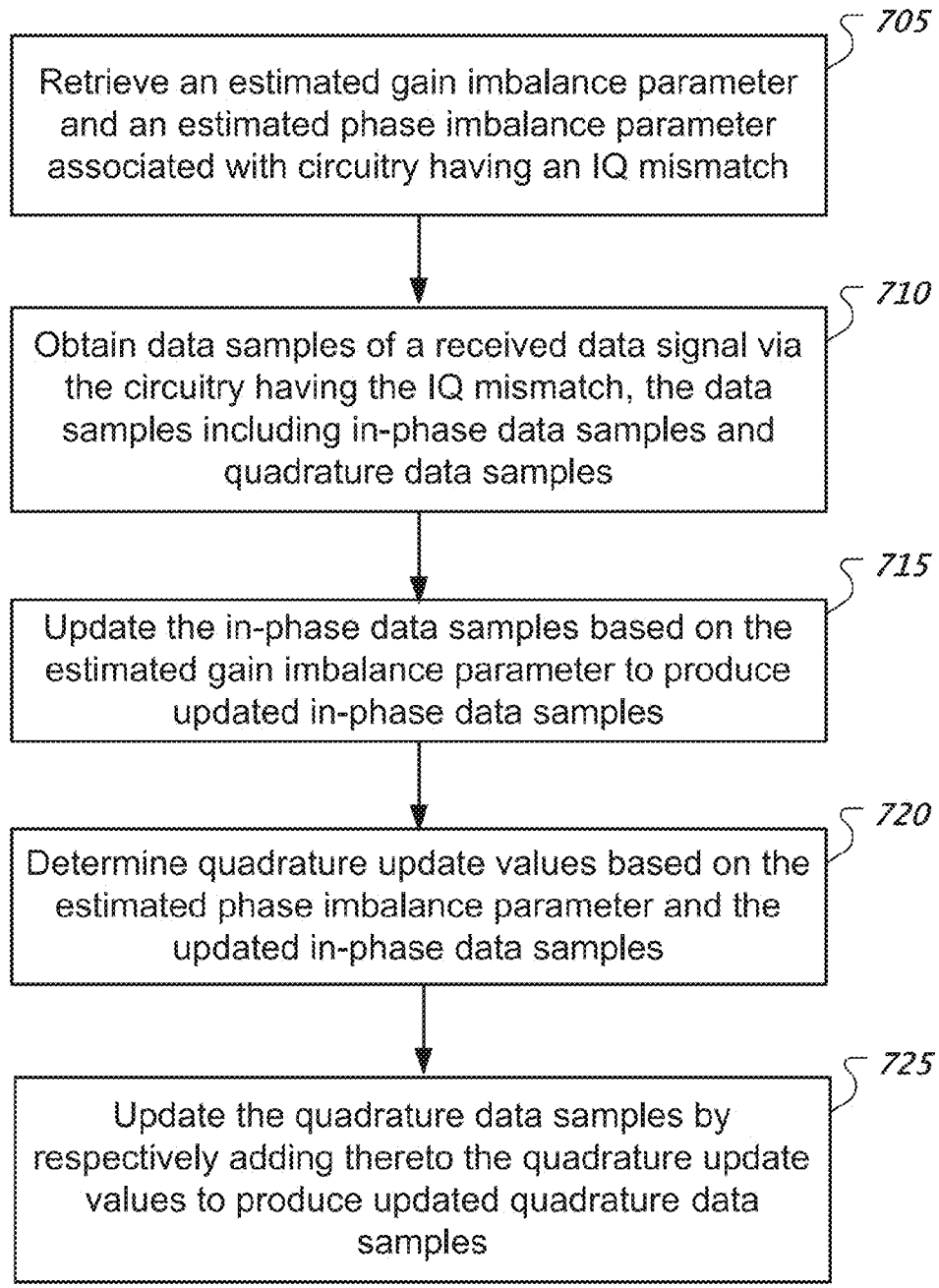
FIG. 7 shows a flowchart for an example of an IQ mismatch compensation process.

The process can include storing the estimated phase imbalance parameter and the estimated gain imbalance parameter for use by an IQ mismatch compensation process FIG. 7 shows a flowchart for an example of an IQ mismatch compensation process. At 705, the process retrieves an estimated gain imbalance parameter and an estimated phase imbalance parameter associated with circuitry having an IQ mismatch. Retrieving the parameters can include accessing values from a memory. At 710, the process obtains samples of a received data signal (referred to herein as "data samples") via the circuitry having the IQ mismatch. The data samples can include in-phase data samples and quadrature data samples. Obtaining data samples can include retrieving in-phase samples from an ADC associated with an in-phase branch and retrieving quadrature samples from an ADC associated with a quadrature branch. In some implementations, in-phase data samples and quadrature data samples are placed in two respective arrays in a memory. In some implementations, a data signal corresponds to a data portion of a packet, where the data portion includes information content that is not predetermined.

At 715, the process updates the in-phase data samples based on the estimated gain imbalance parameter to produce updated in-phase data samples. Updating the in-phase data samples can include multiplicatively applying a factor based on $\varepsilon_{est}$ to each of the in-phase data samples. In some implementations, the applied factor is $(1+\varepsilon_{est})/2$.

At 720, the process determines quadrature update values based on the estimated phase imbalance parameter and the updated in-phase data samples. Determining the quadrature update values can include calculating $U_i = \phi_{est} I''_i$ for i=1, 2 . . . M, where $I''_i$ represents an updated in-phase data sample and $U_i$ represents a quadrature update value. At 725, the process updates the quadrature data samples by respectively adding thereto the quadrature update values to produce updated quadrature data samples. Updating the quadrature data samples can include calculating $Q''_i = Q'_i + U_i$ for i=1, 2, . . . , M, where $Q'_i$ represents a quadrature data sample. In some implementations, M corresponds to a number of data samples corresponding to a data portion of a packet.

Figure 8:
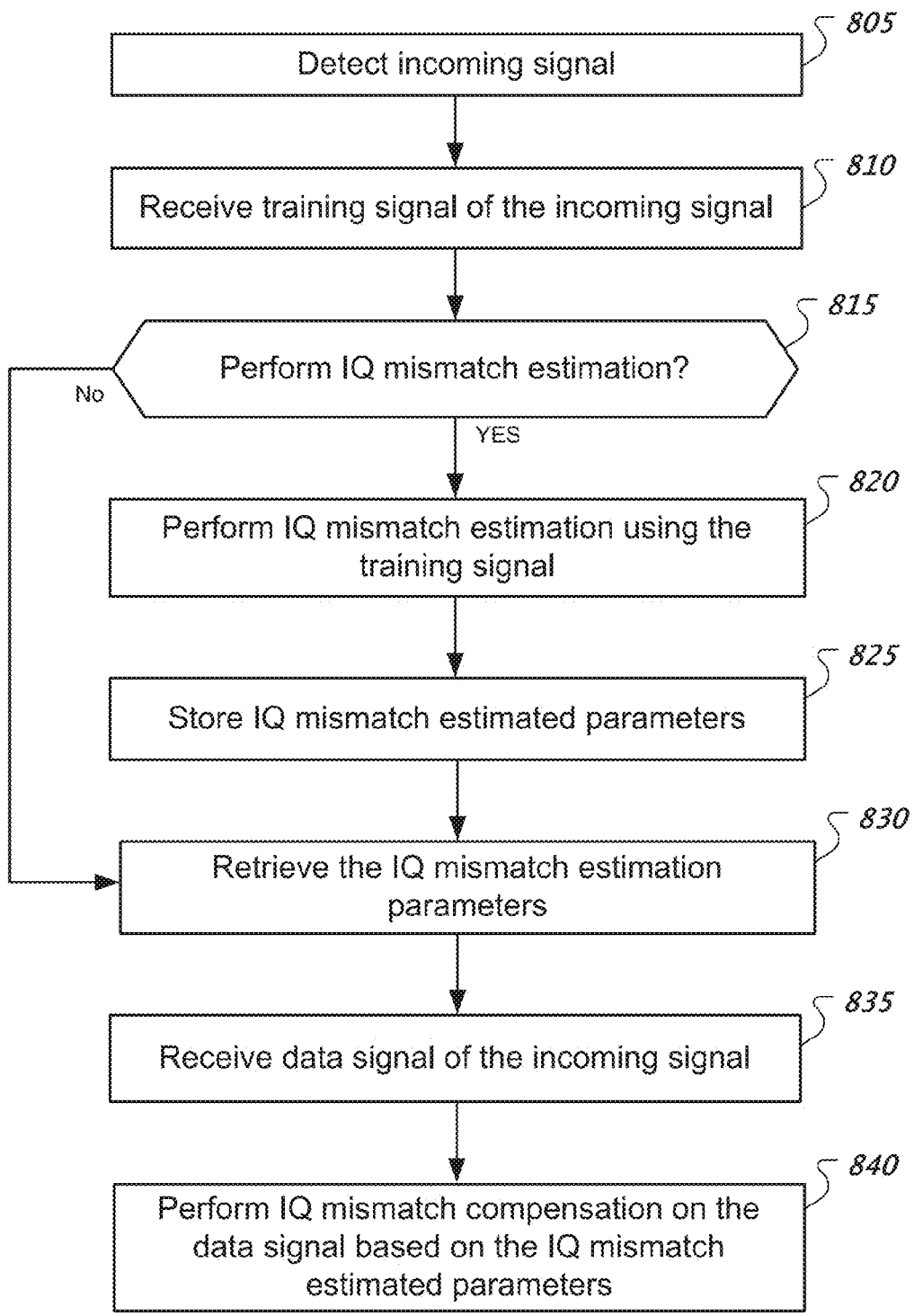
FIG. 8 shows a flowchart for an example of an IQ mismatch estimation and compensation process.

FIG. 8 shows a flowchart for an example of an IQ mismatch estimation and compensation process. At 805, the process detects an incoming signal. In some implementations, detecting the incoming signal can include using a preamble detector. At 810, the process receives a training signal of the incoming signal. In some implementations, the training signal is within a preamble portion of the incoming signal. At 815, the process determines whether to perform an IQ mismatch estimation. Determining whether to perform the IQ mismatch estimation can include determining whether IQ mismatch estimation parameters have been or have not been previously calculated. In some implementations, IQ mismatch estimation can be performed for every detected incoming signal. In some implementations, IQ mismatch estimation can be performed for one out of every K detected incoming signals, where K is a predetermined parameter. If IQ mismatch estimation is not required, the process continues at 830. Otherwise, at 820, the process performs the IQ mismatch estimation using the training signal. At 825, the process stores IQ mismatched estimated parameters. At 830, the process retrieves the IQ mismatch estimated parameters. At 835, the process receives a data signal of the incoming signal. At 840, the process performs IQ mismatch compensation on the data signal based on the IQ mismatch estimated parameters.

Figure 9:
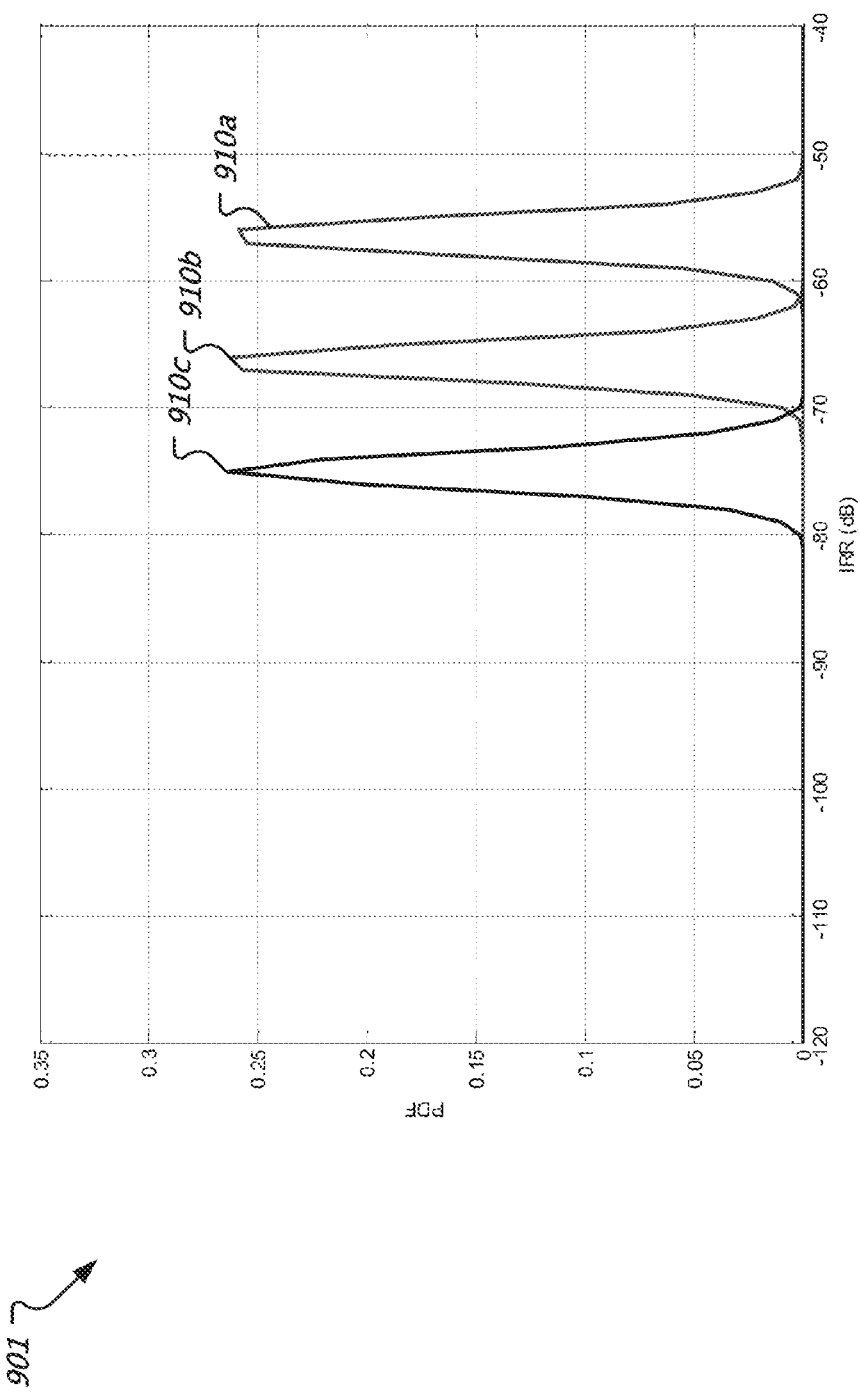
FIG. 9 shows a graph depicting the image rejection performance of a described technology.

FIG. 9 shows a graph 901 depicting the image rejection performance of a described technology. The graph 901 includes three different plots 910*a-c* corresponding to different signal-to-noise-ratios (SNRs) of 20 dB, 30 dB, and 40 dB, respectively. The graph 901 shows a probability density function (PDF) output for each of the plots 910*a-c* against IRR (dB).

Figure 10:
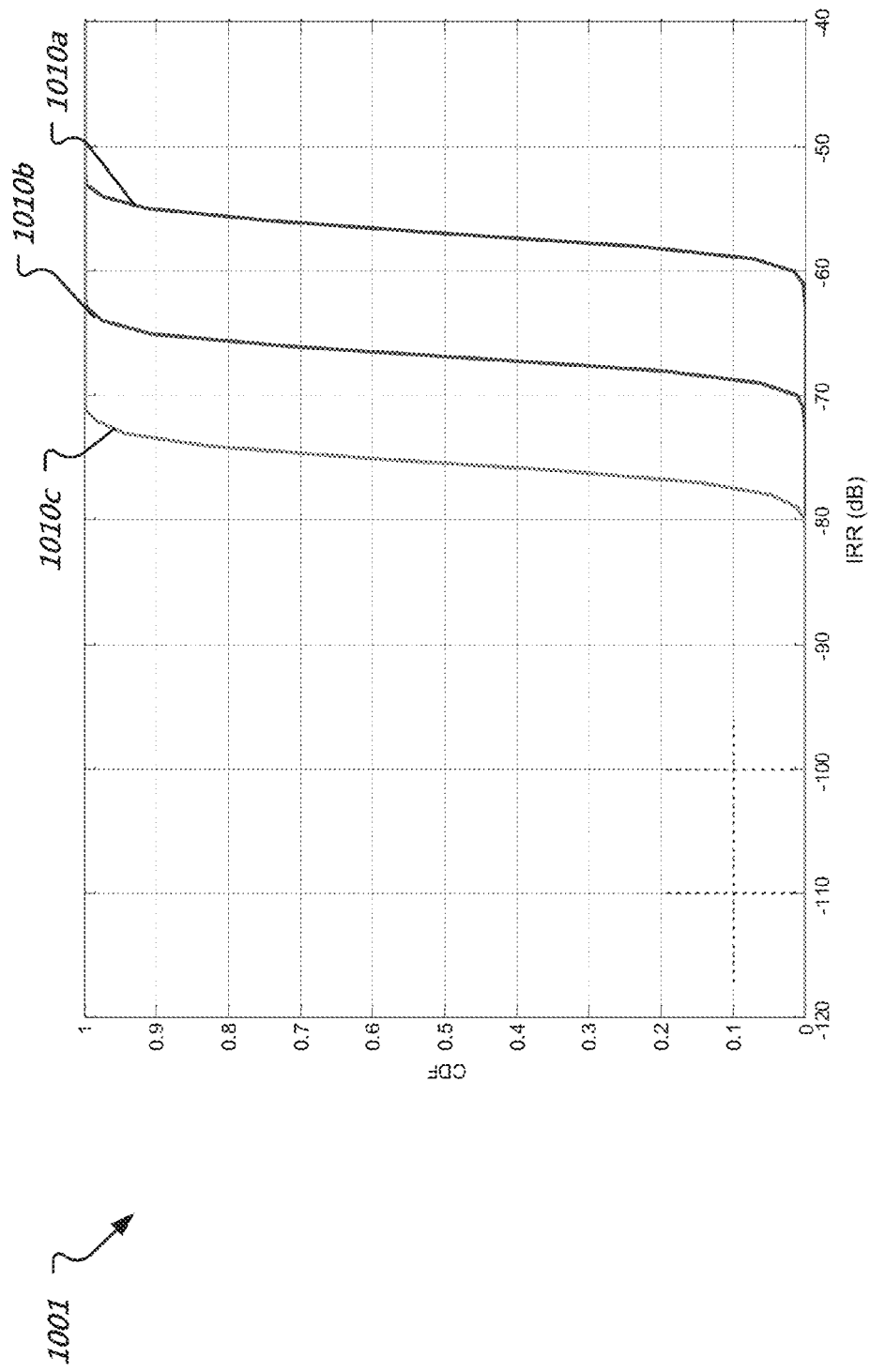
FIG. 10 shows another graph depicting the image rejection performance of a described technology.

FIG. 10 shows another graph 1001 depicting the image rejection performance of a described technology. The graph 1001 includes three different plots 1010*a-c* corresponding to different signal-to-noise-ratios (SNRs) of 20 dB, 30 dB, and 40 dB, respectively. The graph 1001 shows a cumulative distribution function (CDF) output for each of the plots 1010*a-c* against IRR (dB). Note that at the 0.90 level for CDF, the IRR performance is about −65 dB for plot 1010*b*, which has a SNR of 30 dB.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
    obtaining samples of a received signal via circuitry having an in-phase and quadrature (IQ) mismatch, the samples comprising (i) first samples, including in-phase first samples and quadrature first samples, of a training signal of the received signal and (ii) second samples, including in-phase second samples and quadrature second samples, of a data signal of the received signal;
    determining an estimated gain imbalance parameter for the IQ mismatch based on (i) an in-phase average value and (ii) a quadrature average value, the in-phase average value being based on the in-phase first samples, and the quadrature average value being based on the quadrature first samples;
    determining an estimated phase imbalance parameter for the IQ mismatch based on (i) a combined average value, (ii) the estimated gain imbalance parameter, and (iii) a squared average value, the combined average value being based on a pair-wise multiplication of the in-phase first samples and the quadrature first samples, the squared average value being based on squared versions of the in-phase first samples;
    updating the in-phase second samples based on the estimated gain imbalance parameter to produce updated in-phase second samples; and
    updating the quadrature second samples by respectively adding quadrature update values to the quadrature second samples to produce updated quadrature second samples, the quadrature update values being respectively based on (i) the estimated phase imbalance parameter and (ii) the updated in-phase second samples.

2. The method of claim 1, wherein determining the estimated gain imbalance parameter comprises calculating in accordance with $$\varepsilon_{est} = \frac{E[Q']}{E[I']} - 1,$$

wherein $\varepsilon_{est}$ represents the estimated gain imbalance parameter, $E[Q']$ represents the quadrature average value, and $E[I']$ represents the in-phase average value.

3. The method of claim 2, wherein determining the estimated phase imbalance parameter comprises calculating in accordance with $$\phi_{est} = \frac{E[I' \cdot Q']}{-E[I'^2] \cdot (1 + \varepsilon_{est})/4},$$

wherein $\phi_{est}$ represents the estimated phase imbalance parameter, $E[I' \cdot Q']$ represents the combined average value, and $E[I'^2]$ represents the squared average value.

4. The method of claim 3, wherein updating the in-phase second samples comprises multiplicatively applying a factor based on $\varepsilon_{est}$ to each of the in-phase second samples.

5. The method of claim 4, wherein updating the quadrature second samples comprises multiplicatively applying a factor based on $\phi_{est}$ to each of the updated in-phase second samples to respectively produce the quadrature update values.

6. The method of claim 2, wherein determining the estimated phase imbalance parameter comprises calculating in accordance with $$\phi_{est} = \arcsin\left(\frac{E[I' \cdot Q']}{-E[I'^2] \cdot (1 + \varepsilon_{est})/4}\right),$$

wherein $\phi_{est}$ represents the estimated phase imbalance parameter, $E[I' \cdot Q']$ represents the combined average value, and $E[I'^2]$ represents the squared average value.

7. The method of claim 1, wherein the training signal comprises a single tone signal.

8. The method of claim 1, wherein the training signal corresponds to a preamble portion of a packet, and the data signal corresponds to a data portion of the packet.

9. An apparatus, comprising:
    first circuitry configured to
        determine an in-phase average value based on (i) in-phase first samples of a training signal received via circuitry having an IQ mismatch, (ii) a quadrature average value based on quadrature first samples of the training signal, (iii) a squared average value based on squared versions of the in-phase first samples, and (iv) a combined average value based on a pair-wise multiplication of the in-phase first samples and the quadrature first samples, determine an estimated gain imbalance parameter for the IQ mismatch based on the in-phase average value and the quadrature average value, and determine an estimated phase imbalance parameter for the IQ mismatch based on (i) the combined average value, (ii) the estimated gain imbalance parameter, and (iii) the squared average value; and second circuitry configured to update in-phase second samples of a data signal received via the circuitry having the IQ mismatch based on the estimated gain imbalance parameter to produce updated in-phase second samples, and update quadrature second samples of the data signal by respectively adding quadrature update values to the quadrature second samples to produce updated quadrature second samples, the quadrature update values being respectively based on (i) the estimated phase imbalance parameter and (ii) the updated in-phase second samples.

10. The apparatus of claim 9, wherein the estimated gain imbalance parameter is based on $$\frac{E[Q']}{E[I']} - 1,$$

wherein $\epsilon_{est}$ represents the estimated gain imbalance parameter, $E[Q']$ represents the quadrature average value, and $E[I']$ represents the in-phase average value.

11. The apparatus of claim 10, wherein the estimated phase imbalance parameter is based on $$\frac{E[I' \cdot Q']}{-E[I'^2] \cdot (1 + \varepsilon_{est})/4},$$

wherein $\phi_{est}$ represents the estimated phase imbalance parameter, $E[I' \cdot Q']$ represents the combined average value, and $E[I'^2]$ represents the squared average value.

12. The apparatus of claim 11, wherein the second circuitry is configured to multiplicatively apply a factor based on $\epsilon_{est}$ to each of the in-phase second samples to respectively produce the updated in-phase second samples.

13. The apparatus of claim 12, wherein the second circuitry is configured to multiplicatively apply a factor based on $\phi_{est}$ to each of the updated in-phase second samples to respectively produce the quadrature update values.

14. The apparatus of claim 10, wherein the estimated phase imbalance parameter is based on $$\arcsin\left(\frac{E[I' \cdot Q']}{-E[I'^2] \cdot (1 + \varepsilon_{est})/4}\right),$$

wherein $\phi_{est}$ represents the estimated phase imbalance parameter, $E[I' \cdot Q']$ represents the combined average value, and $E[I'^2]$ represents the squared average value.

15. The apparatus of claim 9, wherein the training signal comprises a single tone signal.

16. The apparatus of claim 9, wherein the training signal corresponds to a preamble portion of a packet, and the data signal corresponds to a data portion of the packet.

17. A system, comprising:

a downconverter configured to receive signals comprising a training signal and a data signal;

an analog-to-digital convertor coupled with the downconverter, and configured to produce samples based on the receive signals, the samples comprising (i) first samples of the training signal and (ii) second samples of the data signal, the first samples comprising (i) in-phase first samples and (ii) quadrature first samples, the second samples comprising (i) in-phase second samples and (ii) quadrature second samples; and a processor coupled with the convertor, and configured to perform operations comprising:

determining an in-phase expected value based on (i) the in-phase first samples, (ii) a quadrature expected value based on the quadrature first samples, (iii) a squared expected value based on squared versions of the in-phase first samples, and (iv) a combined expected value based on a pair-wise multiplication of the in-phase first samples and the quadrature first samples;

determining an estimated gain imbalance parameter for an IQ mismatch associated with at least the downconverter based on (i) the in-phase expected value and (ii) the quadrature expected value;

determining an estimated phase imbalance parameter for the IQ mismatch based on (i) the combined expected value, (ii) the estimated gain imbalance parameter, and (iii) the squared expected value;

updating the in-phase second samples based on the estimated gain imbalance parameter to produce updated in-phase second samples; and updating the quadrature second samples by respectively adding thereto quadrature update values to produce updated quadrature second samples, the quadrature update values being respectively based on the estimated phase imbalance parameter and the updated in-phase second samples.

18. The system of claim 17, wherein determining the estimated gain imbalance parameter comprises calculating in accordance with $$\varepsilon_{est} = \frac{E[Q']}{E[I']} - 1,$$

wherein $\epsilon_{est}$ represents the estimated gain imbalance parameter, $E[Q']$ represents the quadrature expected value, and $E[I']$ represents the in-phase expected value.

19. The system of claim 18, wherein determining the estimated phase imbalance parameter comprises calculating in accordance with $$\phi_{est} = \frac{E[I' \cdot Q']}{-E[I'^2] \cdot (1 + \varepsilon_{est})/4},$$

wherein $\phi_{est}$ represents the estimated phase imbalance parameter, $E[I' \cdot Q']$ represents the combined expected value, and $E[I'^2]$ represents the squared expected value.

20. The system of claim 19, wherein updating the in-phase second samples comprises multiplicatively applying a factor based on $\epsilon_{est}$ to each of the in-phase second samples.

21. The system of claim 20, wherein updating the quadrature second samples comprises multiplicatively applying a factor based on $\phi_{est}$ to each of the updated in-phase second samples to respectively produce the quadrature update values.

22. The system of claim 17, wherein the training signal corresponds to a preamble portion of a packet, and the data signal corresponds to a data portion of the packet.

* * * * *